United States Patent [19]
Schaller et al.

[11] 3,751,858
[45] Aug. 14, 1973

[54] AUTOMATIC WORK REST BLADE CHANGER FOR CENTERLESS GRINDER

[75] Inventors: Robert L. Schaller, Syracuse; Michael W. Lamb, Minoa, both of N.Y.

[73] Assignee: Sundstrand-Engelburg, Inc., Liverpool, N.Y.

[22] Filed: Jan. 7, 1972

[21] Appl. No.: 216,016

[52] U.S. Cl......... 51/238 GG, 51/103 R, 51/262 R
[51] Int. Cl............................................. B24b 41/06
[58] Field of Search.................. 51/238 R, 238 GG, 51/238 T, 103 R, 103 WH, 103 TF, 262 R

[56] References Cited
UNITED STATES PATENTS

| | | | |
|---|---|---|---|
| 2,897,636 | 8/1959 | Pyne et al. .................. | 51/238 GG X |
| 3,127,716 | 4/1964 | Peters et al. ................. | 51/103 R X |
| 3,466,810 | 9/1969 | Schaller .......................... | 51/238 R |

*Primary Examiner*—Harold D. Whitehead
*Assistant Examiner*—Nicholas P. Godici
*Attorney*—Bruns & Jenney

[57] ABSTRACT

An automatic blade changer for the work rest structure of a centerless grinder. The different sized blades are stored in a rack that moves on signal to present the blade that is called for to a pick up mechanism on a swingable blade carrier. The pick up mechanism withdraws the blade from the rack after which the carrier moves through an arc to position the blade above the work rest structure. The pick up mechanism then deposits the blade in the work rest structure, the latter having releasable clamping means to secure the blade therein. To return the blade to the storage rack the sequence of operations is reversed.

7 Claims, 7 Drawing Figures

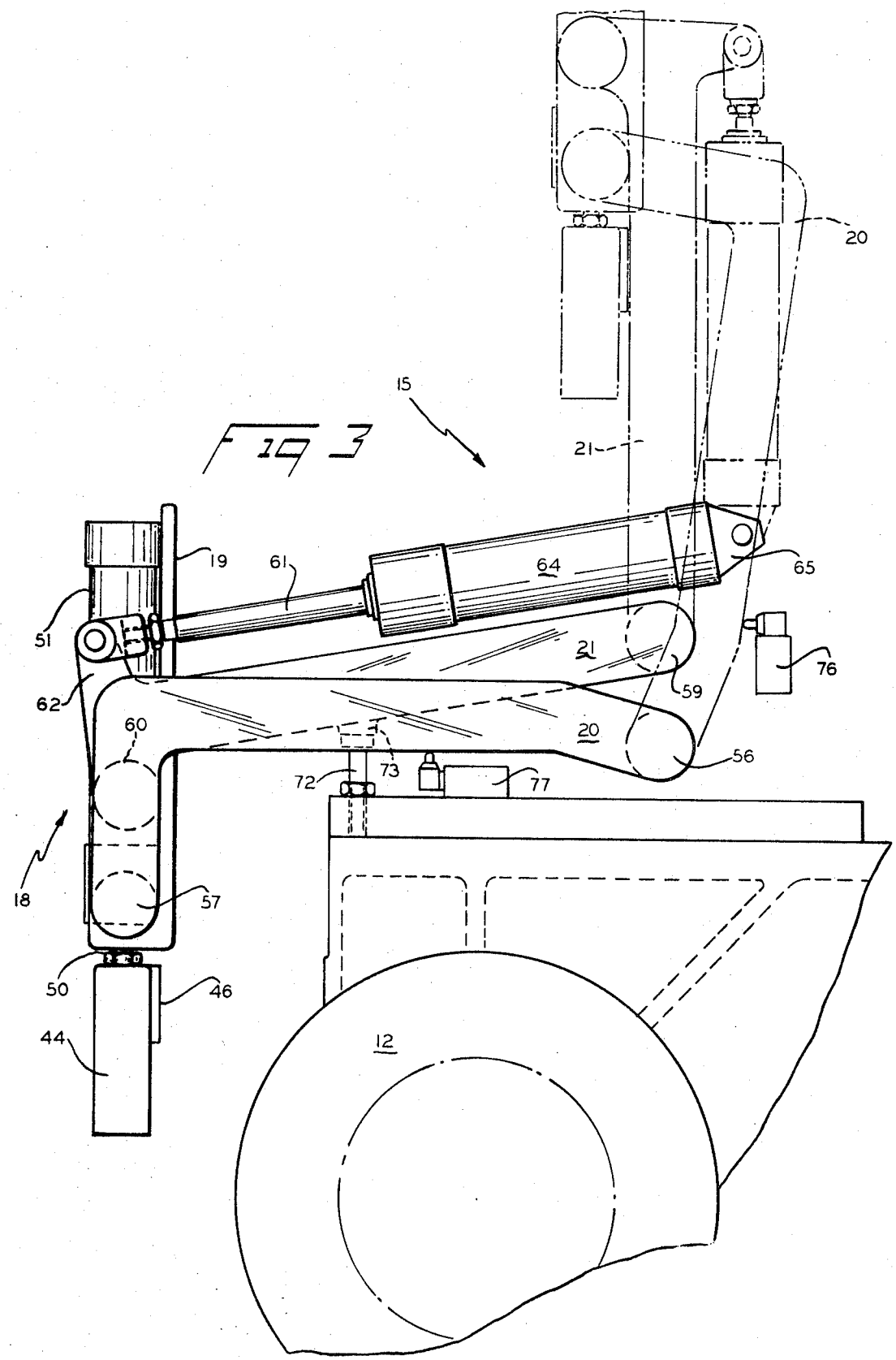

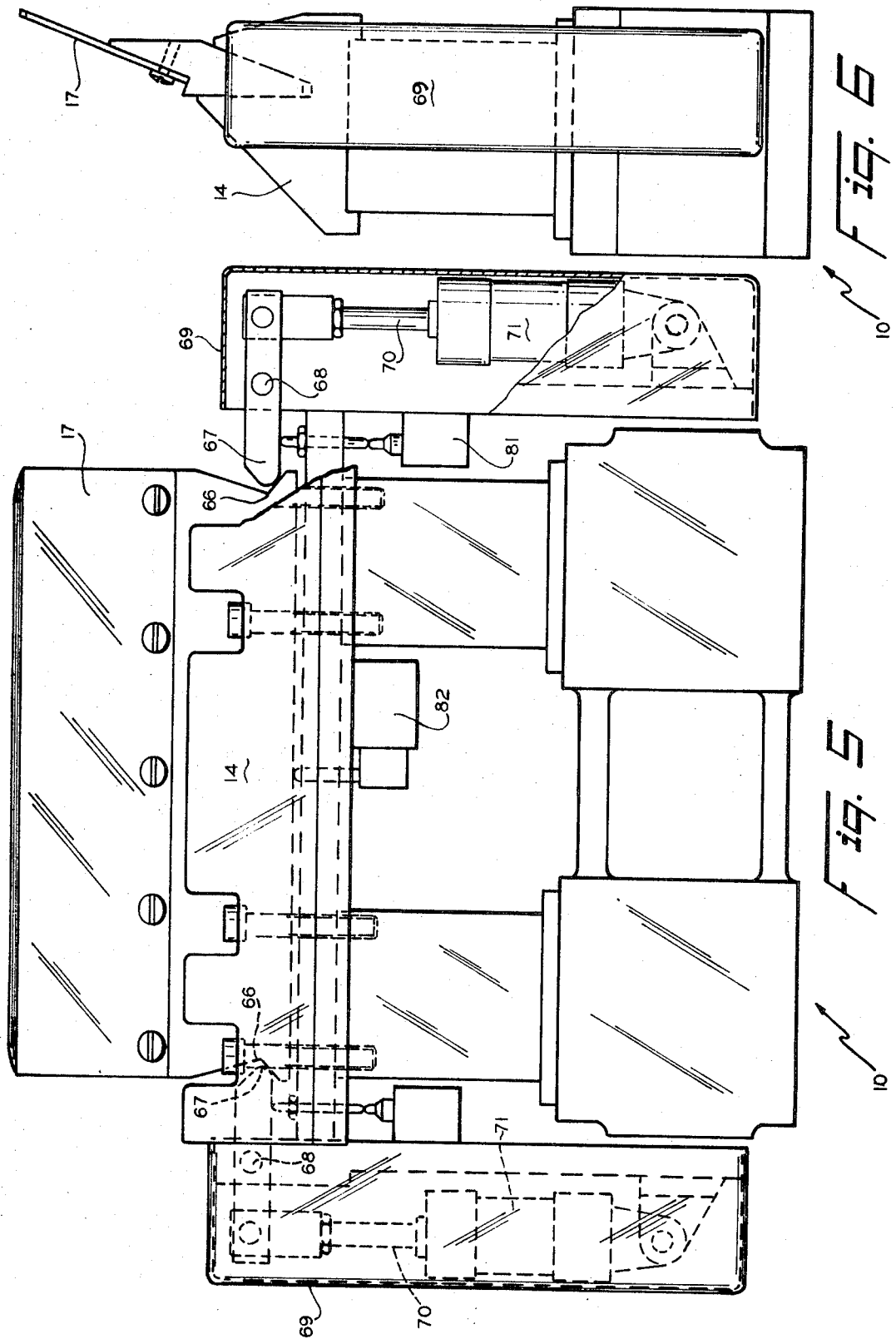

AUTOMATIC WORK REST BLADE CHANGER FOR CENTERLESS GRINDER

BACKGROUND OF THE INVENTION

This invention relates generally to centerless grinders, and has particular reference to a novel work rest blade changer for a centerless grinder.

Through-feed fixtures have heretofore been developed for centerless grinders wherein a single work rest blade can be adjustably positioned so as to accommodate workpieces having a relatively large range of diameters. Such a fixture is disclosed in U.S. Pat. No. 3,466,810, issued Sept. 16, 1969 to R. L. Schaller and assigned to the owner of the present application. With the adjustment permitted by the patented fixture, only one work rest blade is required to handle diameters of from 1–10 inches.

With workpieces having a diameter of less than 1 inch, as in so-called wire grinding operations, it is not possible to use a single work rest blade for the various diameters in the 1/32–1 inch range and simply adjust the position of the blade. As many as seven or eight different blades may be required and this means that each time there is a material change in the diameter of the workpiece the machine must be stopped and the blade changed. This is time consuming and bothersome because the blade already in the blade support of the throughfeed fixture must be unbolted from the support and removed, and the new blade must be selected and bolted in position.

SUMMARY OF THE INVENTION

The present invention is directed to an automatic work rest blade changer particularly for use with centerless wire grinding machines. If desired, the sequence of changes can be programmed and the blade changer can be computer controlled. In any case, the need for manual control is at a minimum.

In accord with the invention the blades are not bolted to the blade support but are releasably secured therein as by solenoid actuated clamping fingers. The different sized blades are stored in a selectively movable rack and, assuming the blade support to be initially empty, this rack moves on signal to present the blade that is called for to a pick up mechanism on a swingable blade carrier. The pick up mechanism withdraws the blade from the rack after which the carrier moves to position the blade above the work rest. The pick up mechanism then deposits the blade in the work rest and the clamping fingers are actuated to hold it there. As each step in the sequence of operation is completed, a suitable switch is actuated to initiate the next step.

BRIEF DESCRIPTION OF THE DRAWINGS

FIG. 3 is a side elevation corresponding to FIG. 1 with other parts omitted for clarity;

FIG. 5 is an enlarged front elevation of the work rest support;

FIG. 6 is an enlarged right side elevation of the work rest support; and

DESCRIPTION OF THE PREFERRED EMBODIMENT

Figure 1:
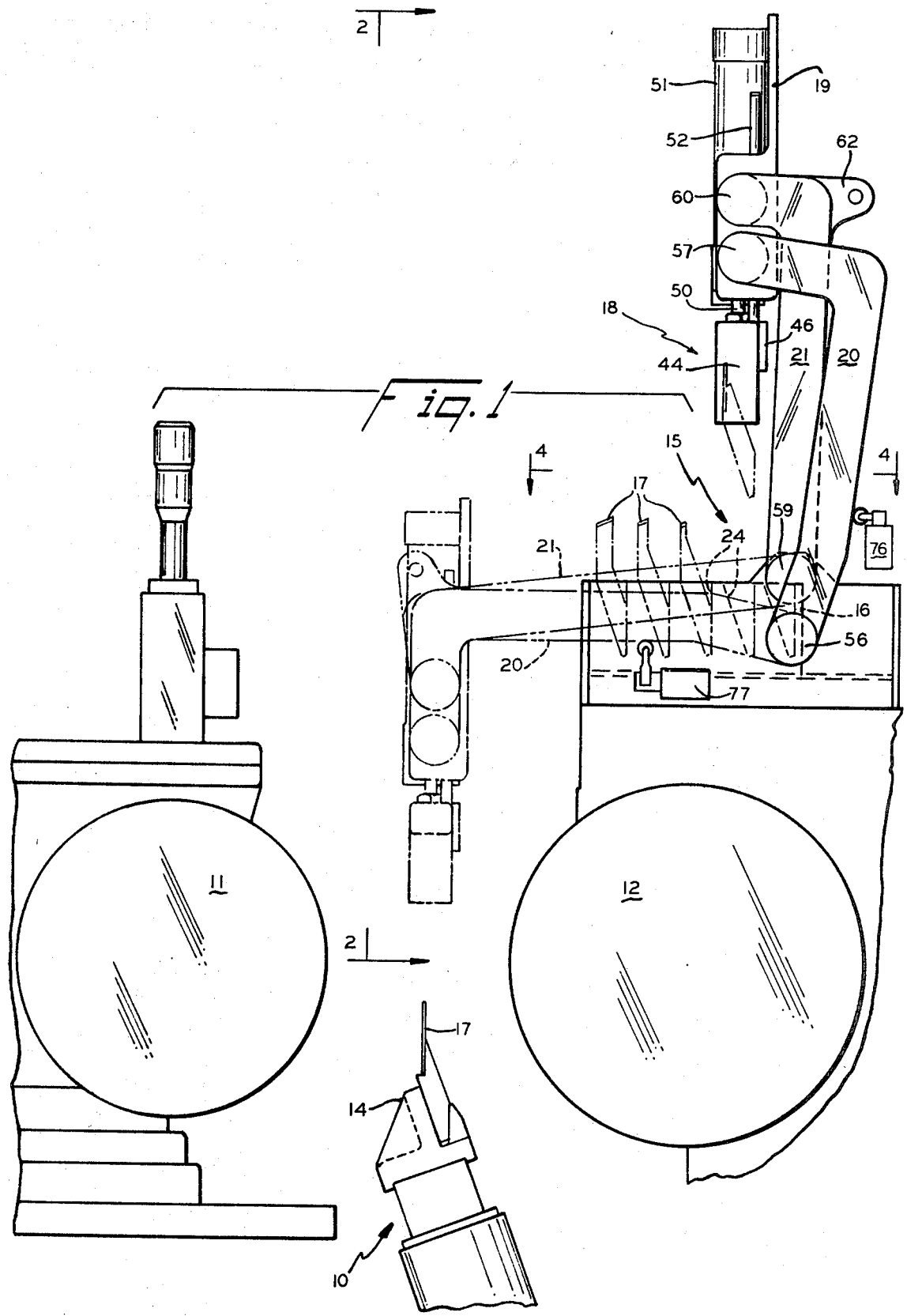
FIG. 1 is a side elevation of a work rest blade changer embodying the invention, with certain parts omitted for clarity.

Having reference now to FIG. 1, portions of a centerless grinder are shown including the work rest structure, diagrammatically indicated at 10, which is located between the regulating wheel 11 and grinding wheel 12, both of which are substantially conventional. To accommodate workpieces of different diameters, the regulating and grinding wheels can be moved linearly towards or away from each other on a line joining the centers of the wheels, and the blade support 14 of the work rest structure can be moved along a linear path inclined toward the regulating wheel by means described in U.S. Pat. No. 3,466,810, supra. The blade changing apparatus, generally indicated at 15, is supported above the grinding wheel 12 by a portion of the machine frame.

Briefly, the blade changer 15 includes a selectively movable blade storage rack 16 carrying work rest blades 17 of different sizes, a vertically movable blade pick up and deposit mechanism 18 carried by a plate 19 and two pairs of swing arms 20,21 to permit the plate to be moved through an arc of approximately 90° between positions above the storage rack and above the blade support 14. In operation, assuming the blade support to be initially empty, the rack moves on signal to position the blade that is called for directly below the pick up and deposit mechanism 18. The mechanism then lowers, grasps the blade and rises again after which the swing arms are actuated to move the mechanism and selected blade into position above the blade support. The mechanism then lowers to deposit the blade in the support, and thereafter it rises and is returned to its position above the rack by the swing arms 20,21.

Figure 4:
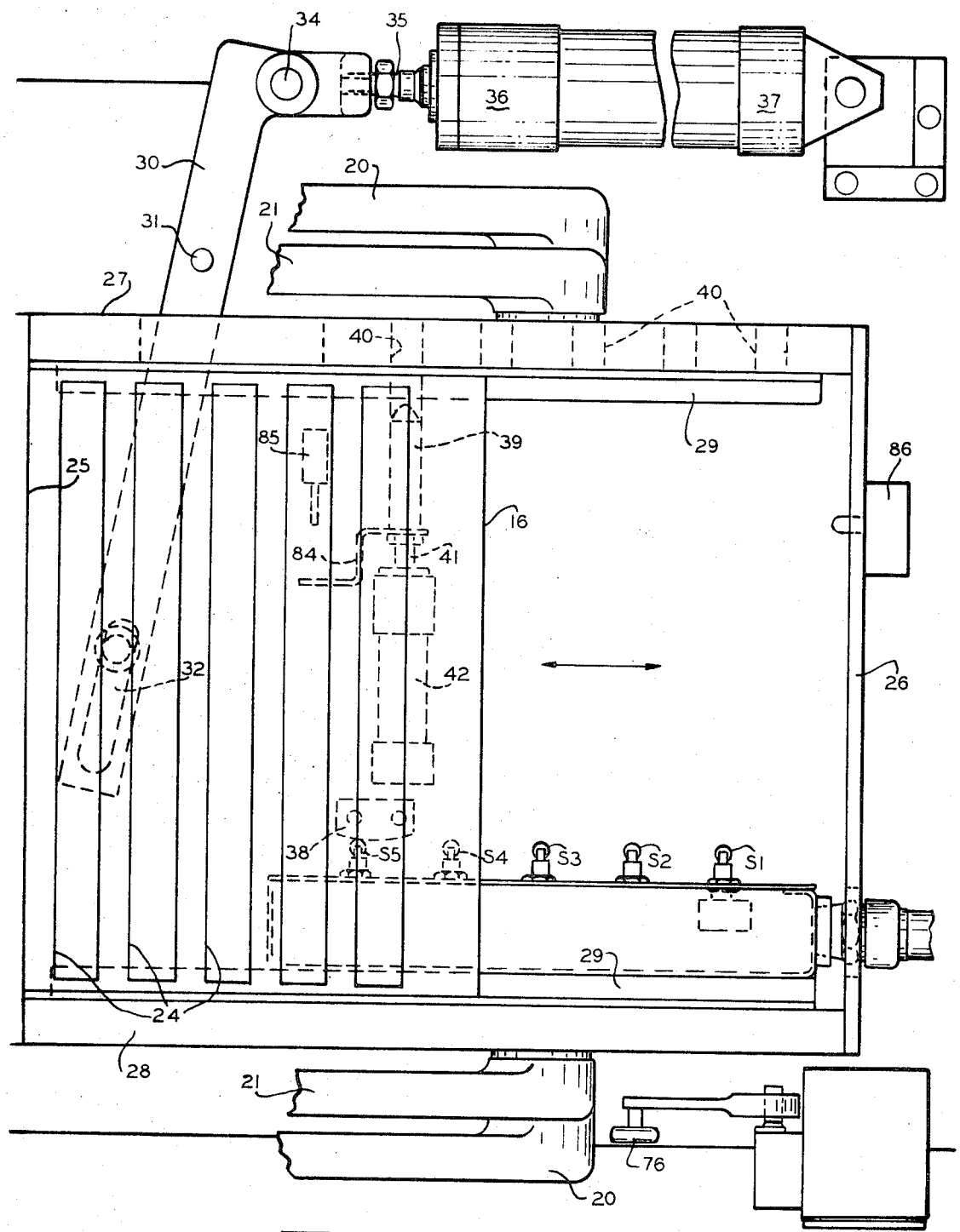
FIG. 4 is an enlarged horizontal section taken on line 4—4 of FIG. 1, with the blades removed from the blade storage rack.

In the embodiment of the invention disclosed, rack 16 is adapted to store five blades 17 of different sizes, the blades being received in slots 24. As best shown in FIG. 4, the rack is mounted in a box-like structure having front and back walls 25,26 and side walls 27,28. It is movable between the front and back walls, being supported and guided by inwardly projecting ways 29.

Movement of rack 16 is effected by a lever 30 pivoted at 31 and having one end connected to the underside of the rack through a lost motion connection 32. The other end of the lever is connected at 34 to a plunger 35 actuated by a pair of solenoids 36,37 contained in a common housing. Also mounted on the underside of the rack is a depending block 38 that coacts with one of five switches S1–S5 to properly locate the rack for withdrawal of the selected blade as will be explained in more detail hereinafter. A locking pin 39 coacts with one of five bores 40 in the side wall 27 to lock the rack in the selected position, the pin being connected to a plunger 41 actuated by a solenoid 42 on the underside of the rack.

The blade pick up and deposit mechanism 18, FIGS. 1–3 and 7, includes a pair of blade clamping fingers 44 adapted to engage the side edges of the selected blade. The clamping fingers are pivotally connected at 45 to a plate 46 that supports a cylinder 47 containing a pair of solenoids. The solenoids actuate plungers 48 connected to the fingers as at 49 whereby axial movement of the plungers operates to move the fingers into and out of clamping engagement with the blades.

Cylinder 47 is connected to the lower end of a solenoid actuated plunger 50, the solenoid for which is contained in a cylinder 51 mounted on the plate 19. Movement of the plunger operates to raise and lower cylinder 47 and the associated clamping fingers. To prevent rotation of the clamping fingers as they are raised and lowered, a pair of guide rods 52 are provided, the rods being threaded at their lower ends into bosses 54 formed on the plate 46 and passing with a free fit through bores in bosses 55 formed on plate 19.

The two pairs of swing arms 20,21 enable plate 19 and the blade pick up and deposit mechanism carried thereby to remain in vertical position while being moved through an arc of approximately 90°. To this end, the lower ends of arms 20 are pivotally connected as at 56 to the opposite side walls 27,28 of the rack supporting box and the upper ends thereof are pivotally connected as at 57 to opposite side flanges 58 on plate 19. Similarly, the lower ends of arms 21 are connected as at 59 to the rack box side walls and the upper ends are connected as at 60 to the flanges 58.

Figure 2:
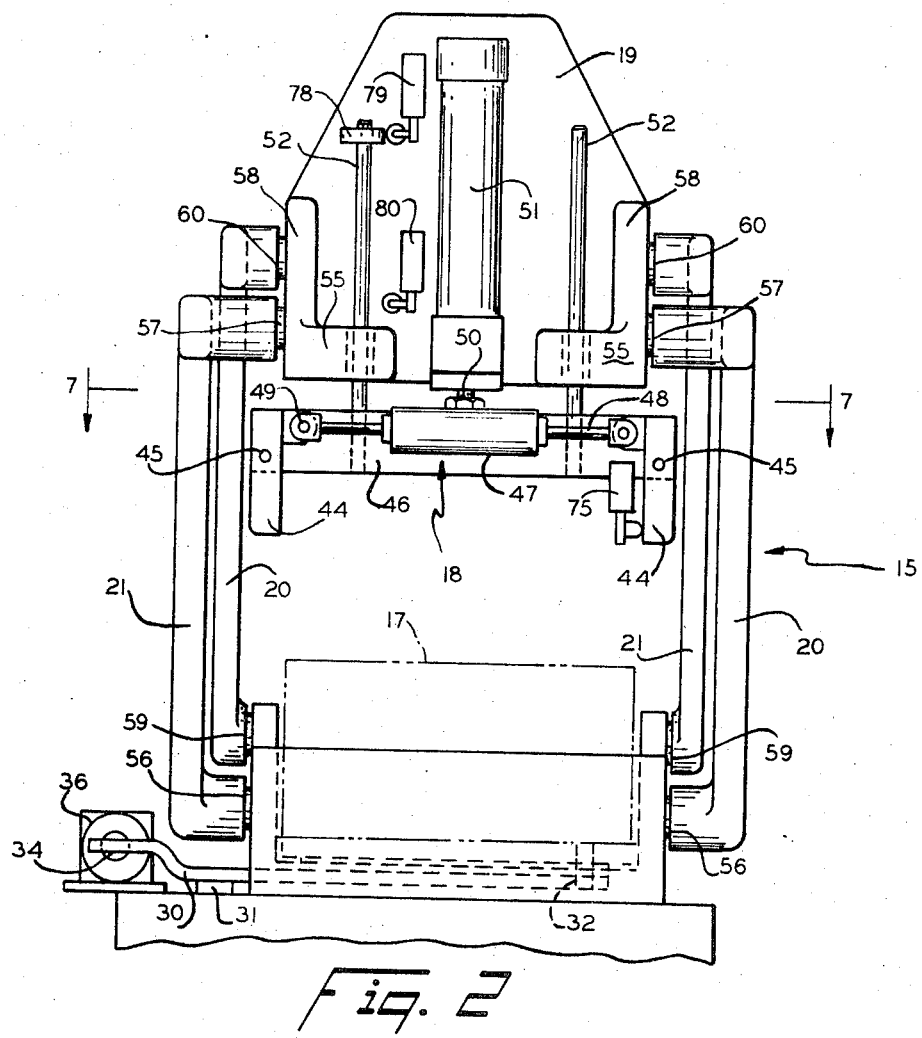
FIG. 2 is a front elevation of the blade changer taken from approximately the position of line 2—2 of FIG. 1.

Movement of plate 19 from its position above the blade storage rack to its position above the blade support 14 is effected by movement of a solenoid actuated plunger 61, FIG. 3, the outer end of which is pivotally connected to a lug 62 formed on the right swing arm 21 (as viewed in FIG. 2). The solenoid for plunger 61 is contained in a cylinder 64 that is pivotally connected at its opposite end 65 to an upstanding projection (omitted for clarity in FIG. 3) on rack box sidewall 28.

In FIGS. 5 and 6, a work rest blade 17 is shown in the blade support 14 of the work rest structure which is of the type described in U.S. Pat. No. 3,466,810, supra. The opposite side edges of each blade are formed with notches 66 which receive fingers 67 to secure the blade in the support. Each finger 67 is pivotally connected at 68 to a housing 69 mounted on a side of the blade support, and the inner end of the finger is connected to the outer end of a solenoid actuated plunger 70. The solenoid for the plunger is contained in cylinder 71 mounted in the housing.

Operation of the work rest blade changer is as follows, it being assumed in the description that a blade 17 is already in the blade support 14 and that it has become necessary to replace it with a blade of another size. The selector switch (not shown) is moved to one of its five possible positions, 1-5, to select the new blade size. This sets, or places in a condition of readiness, one of the switches S1-S5 shown in FIG. 4. The cycle START pushbutton (not shown) is then depressed and this causes the solenoids in cylinder 47, FIGS. 2 and 7, to be energized whereby the blade clamping fingers 44 are opened. Depressing the start button also energizes the solenoid in cylinder 64, FIG. 3, whereby plunger 61 is extended and plate 19 and the blade pick up and deposit mechanism carried thereby are swung down to a position above the blade support 14. To insure that the plate will not swing too far, an adjustable stop 72 is provided on the machine frame for engagement with a boss 73 on one of the swing arms 21.

When the clamping fingers 44 open and plate 19 is swung down as described above, switches 75 and 76 shown in FIGS. 2 and 3, respectively, are opened and switch 77, FIG. 3, is closed. This causes the solenoid in cylinder 51, FIGS. 1-3, to be energized whereby plunger 50 is extended and the blade pick up and deposit mechanism 18 is moved downwardly. When this happens, a collar 78 on one of the guide rods 52, FIG. 2, operates to open a switch 79 and close a switch 80, both of which are mounted on plate 19 as shown. This in turn causes the solenoids in cylinder 47, FIGS. 2 and 7, to be deenergized whereby the blade clamping fingers 44 close on the blade that is in blade support 14. As fingers 44 close, one of them closes switch 75, FIG. 2.

Closing switch 75 operates to energize the solenoids in cylinders 71 on the blade support, FIG. 5, whereby the blade locking fingers 67 are rotated out of the blade notches 66. This opens a switch 81 on the blade support which in turn deenergizes the cylinder 51 solenoid, FIGS. 1-3, whereby plunger 50 is retracted and the blade is lifted out of the blade support by pick up and deposit mechanism 18. This movement opens a switch 82 on the blade support and also opens switch 80 and closes switch 79, the two switches actuated by the guide rod collar 78, FIG. 2. Operation of these switches causes the swing arm solenoid in cylinder 64, FIG. 3, to be deenergized whereby plunger 61 is retracted and the swing arms 20,21 move to vertical position with plate 19 positioned above rack 16.

When swing arms 20,21 move up, switch 77 opens and switch 76 closes causing the cylinder 51 solenoid to be energized and its plunger 50 to be extended. This causes the mechanism 18 to deposit the blade it is carrying in the rack 16. The rack will be properly positioned to receive the blade since, in normal operation, it will not have been moved since the blade was withdrawn from it.

Figure 7:
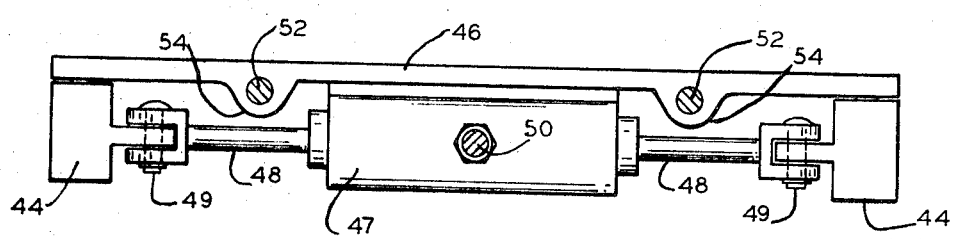
FIG. 7 is an enlarged horizontal section taken on line 7—7 of FIG. 2.

When the pick up and deposit mechanism 18 moves downwardly to deposit the blade in the rack, switch 79 opens and switch 80 closes causing the solenoids in cylinder 47, FIGS. 2 and 7, to be energized whereby blade clamping fingers 44 are opened. This opens switch 75 which causes the solenoid in cylinder 42, FIG. 4, to be energized and locking pin 39 to be withdrawn from the bore 40 in which it is positioned. Pin 39 carries an arm 84 which engages the plunger of a switch 85 to close the switch when the pin is projecting into a bore 40. Withdrawal of the pin causes switch 85 to open and this in turn energizes solenoid 37 causing plunger 35 to extend and rack 16 to be moved to its start position, i.e. with the back of the rack adjacent the box back wall 26 so that switch 86 is closed.

Closing switch 86 deenergizes solenoid 37 and energizes solenoid 36 causing the rack to move from right to left until the blade that was selected by the selector switch at the start of the cycle is positioned directly below the pick up and deposit mechanism 18. Thus, if, for example, the selected blade corresponds to switch S3, FIG. 4, this switch alone will have been set by moving selector switch to position No. 3. As the rack moves from its start position toward the left, the depending block 38 will successively engage and depress switches S1, S2 and S3 but only S3 will close so as to affect a circuit.

Closing switch S3 instantly deenergizes solenoid 36 so that the rack stops in the selected position and, at the same time, deenergizes the cylinder 42 solenoid so that the locking pin 39 projects into the bore 40 that corresponds to the selected position. In so doing arm 84 closes switch 85 causing the solenoids in cylinder 47, FIGS. 2 and 7, to be deenergized and the clamping fingers 44 to close on the selected blade. This in turn causes switch 75 to close deenergizing the cylinder 51 solenoid so that its plunger 50 is retracted and the blade is lifted out of the rack.

The remaining steps are essentially as initially described. Thus, raising the blade pick up and deposit mechanism 18 opens switch 80, closes switch 79 and energizes the swing arm solenoid in cylinder 64 so that plate 19 and mechanism 18 are swung down over the blade support 14. This opens switch 76 and closes switch 77, FIG. 3, whereby the cylinder 51 solenoid is energized and mechanism 18 is lowered. Downward movement of mechanism 18 opens switch 79 and closes switch 80 on plate 19, and also closes switch 82 as the selected blade is deposited in the blade support 14, FIG. 5. This deenergizes the solenoids in cylinders 71 on the blade support whereby the blade locking fingers 67 are moved back into the blade notches 66 to secure the blade in the holder.

When the locking fingers move into the blade notches, switch 81 closes causing the solenoids in cylinder 47, FIGS. 2 and 7, to be energized and blade clamping fingers 44 to open. This in turn opens switch 75 whereby the cylinder 51 solenoid is deenergized and causes the pick up and deposit mechanism 18 to move up. This movement opens switch 80 and closes switch 79 deenergizing the swing arm solenoid in cylinder 64, FIG. 3, so that the swing arms 20,21 return to vertical position. This causes switch 77 to open and switch 76 to close whereby the cycle is completed and all power is removed from the circuits.

From the foregoing description, it will be apparent that the invention provides a novel and very efficient work rest blade changer for a centerless grinder. As will be understood by those familiar with the art, the invention may be embodied in other specific forms without departing from the spirit or essential characteristics thereof.

We claim:

1. In combination with work rest structure for a centerless grinder, the work rest structure including means for releasably securing a work rest blade therein: a rack for storing a plurality of blades of different sizes, a blade carrier movable between positions adjacent the rack and adjacent the work rest structure, and means on the carrier operable to remove a preselected blade from the rack when the carrier is positioned adjacent thereto, the last-named means being operable to deposit the blade in the work rest structure after the carrier has been moved adjacent thereto.

2. Structure as defined in claim 1 wherein the blade carrier is swingable vertically through an arc of approximately 90° between positions directly above the rack and directly above the work rest structure.

3. Structure as defined in claim 1 together with means for selectively moving the blade storage rack so that the desired blade is properly located for removal by the blade removal and deposit means on the carrier.

4. Work rest blade changing apparatus for a centerless grinder comprising a blade support having releasable means for securing a blade therein, a movable rack for storing a plurality of blades of different sizes, a blade carrier movable between a position above the rack and a position above the blade support, blade engaging means mounted on the carrier for movement relative thereto, the blade engaging means being operable to remove a preselected blade from the rack when the carrier is positioned thereabove, the blade engaging means also being operable to deposit the blade in the blade support after the carrier has been moved to a position above it, and means to selectively move the blade storage rack so as to locate the desired blade in proper position for removal by the blade engaging means.

5. Apparatus as defined in claim 4 wherein the movement of the blade carrier is in a vertical plane.

6. Apparatus as defined in claim 4 wherein the means for securing a blade in the blade support comprises locking fingers on the support engageable with notches in the blade.

7. Apparatus as defined in claim 4 wherein the blade engaging means includes pivotable clamping fingers and a support therefor, the fingers and support being movable vertically as a unit relative to the blade carrier.

* * * * *